US011300490B2

(12) United States Patent
Kulkarni et al.

(10) Patent No.: US 11,300,490 B2
(45) Date of Patent: Apr. 12, 2022

(54) GEL PREDICTION MODELING OF WELLBORE FLUIDS USING RHEOLOGY MEASUREMENTS

(71) Applicant: Halliburton Energy Services Inc., Houston, TX (US)

(72) Inventors: Sandeep D. Kulkarni, Kingswood, TX (US); Lalit N. Mahajan, Spring, TX (US); Adam Robert Dotson, Houston, TX (US); Dale E. Jamison, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 329 days.

(21) Appl. No.: 16/610,212

(22) PCT Filed: Dec. 20, 2018

(86) PCT No.: PCT/US2018/066853
§ 371 (c)(1),
(2) Date: Nov. 1, 2019

(87) PCT Pub. No.: WO2020/131071
PCT Pub. Date: Jun. 25, 2020

(65) Prior Publication Data
US 2021/0404336 A1    Dec. 30, 2021

(51) Int. Cl.
*E21B 21/06*    (2006.01)
*G01N 11/14*    (2006.01)
(Continued)

(52) U.S. Cl.
CPC ............ *G01N 11/14* (2013.01); *E21B 21/062* (2013.01); *E21B 21/08* (2013.01); *E21B 44/00* (2013.01)

(58) Field of Classification Search
CPC ........ E21B 21/062; E21B 21/08; G01N 11/14
See application file for complete search history.

(56) References Cited

U.S. PATENT DOCUMENTS 4,867,256 A * 9/1989 Snead .................. C02F 1/52
175/66
5,992,223 A    11/1999 Sabins et al.
(Continued)

FOREIGN PATENT DOCUMENTS

EP    2977751 A1    1/2016

OTHER PUBLICATIONS

"Recommended Practice for Field Testing Oil-Based Drilling Fluids", Fifth Edition, API Recommended Practice 13B-2.
(Continued)

*Primary Examiner* — D. Andrews
(74) *Attorney, Agent, or Firm* — McAfee & Taft

(57) ABSTRACT

Systems and methods for adjusting well operations utilize measured values and curve fitting to determine predicted values of the gel strength of well-treatment fluids. The systems and methods are exemplified by first measuring a plurality of measured values representative of the gel strength of the well-treatment fluid, then determining a mathematical function that fits the plurality of measured values. From the mathematical function, the projected values are determined. The projected values are representative of the gel strength for the well-treatment fluid after a projected-value static period.

20 Claims, 6 Drawing Sheets

(51) Int. Cl.
*E21B 21/08* (2006.01)
*E21B 44/00* (2006.01)

(56) References Cited

U.S. PATENT DOCUMENTS

| | | |
|---|---|---|
| 6,887,832 B2 | 5/2005 | Kirsner et al. |
| 8,132,623 B2 * | 3/2012 | Allin .................. C09K 8/5083 |
| | | 166/300 |
| 2012/0247763 A1 | 10/2012 | Rakitsky et al. |
| 2015/0330213 A1 | 11/2015 | van Oort et al. |
| 2017/0009543 A1 | 1/2017 | Lovorn et al. |

OTHER PUBLICATIONS

"Recommended Practice for Field Testing Water-Based Drilling Fluids", Fifth Edition, ANSI/API Recommended Practice 13B-1, 2017.
International Search Report and Written Opinion issued in PCT Application No. PCT/US2018/066853, dated Sep. 16, 2019.
American Petroleum Institute, "Field Testing Water-based Drilling Fluids", 13-B1, Fifth Edition, May 2019, pp. 1-132.

* cited by examiner

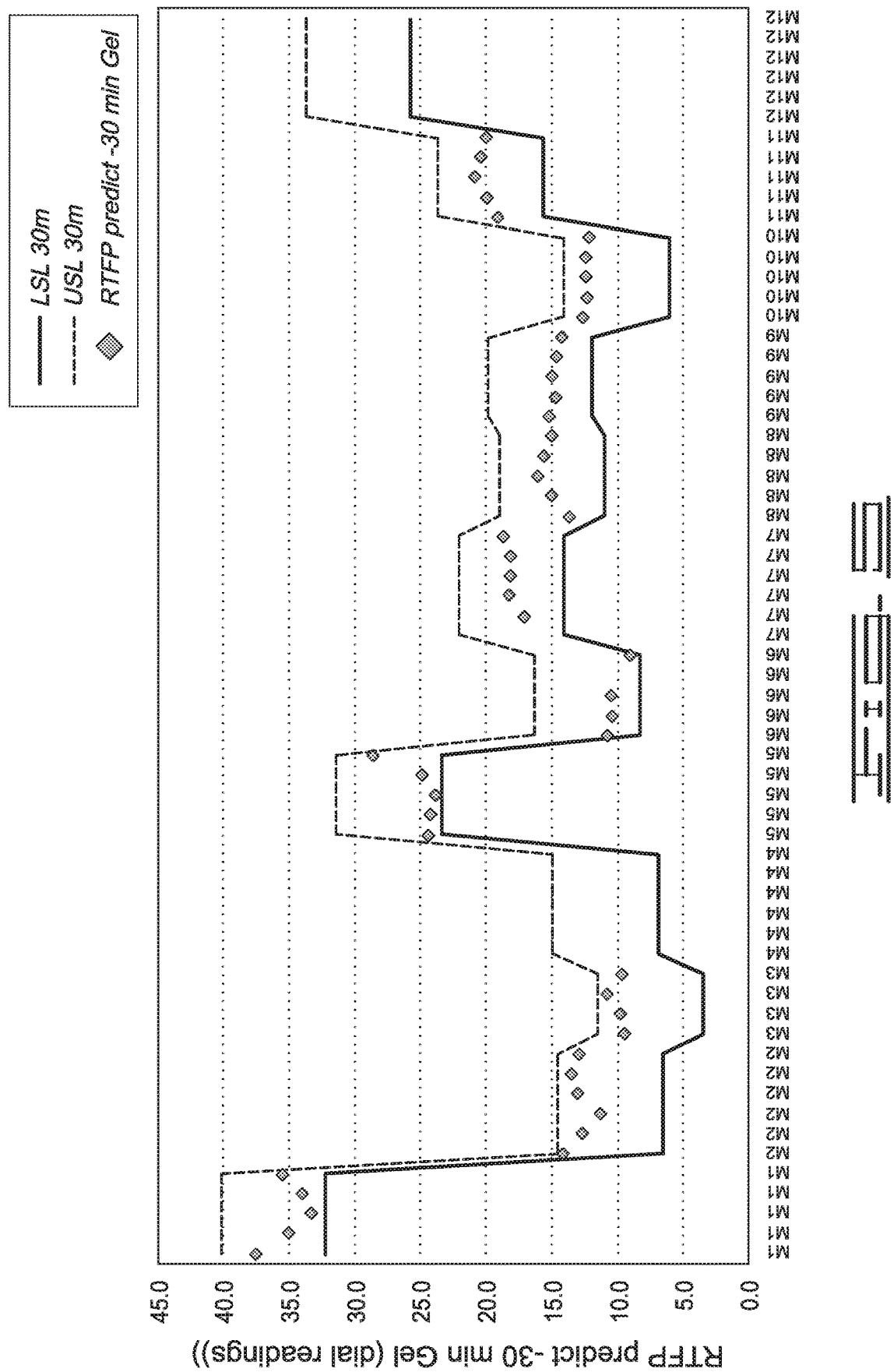

GEL PREDICTION MODELING OF WELLBORE FLUIDS USING RHEOLOGY MEASUREMENTS

FIELD

The present invention relates generally to downhole operations for subterranean formations, more specifically, to real-time measurements of treatment fluids used in downhole well operations.

BACKGROUND

When flowing well-treatment fluids through a wellbore, the fluids exert a pressure on the formation, which should be carefully managed to mitigate damage to the surrounding formation and prevent formation fluids from leaking into the wellbore. For example, during drilling operations, the main functions of the well-treatment fluids—drilling fluids—include providing hydrostatic pressure to help prevent the collapse of unstable strata into the borehole and to prevent formation fluids from entering into the wellbore, Additionally, the drilling fluid helps to keep the drill bit cool and clean during drilling, carry out drill cuttings, and suspend the drill cuttings while drilling is paused and when the drilling assembly is brought in and out of the hole.

Accordingly, managing the "equivalent circulation density" or ECD of the fluid between the fracture gradient and pore-pressure gradient of a formation during a wellbore operation may increase the efficacy and efficiency of the wellbore operation. The "equivalent circulating density" or "ECD" of a fluid refers to effective density exerted by the fluid against the formation taking into account the annular pressure drop. Keeping the ECD of the well-treatment fluid below the fracture gradient of the formation (i.e., the pressure at which fractures are induced in the formation) mitigates damage to the formation and loss of the fluid into the surrounding formation. Additionally, keeping the ECD of the well-treatment fluid above the pore-pressure gradient (i.e., the pressure at which the fluids from the formation infiltrate the wellbore) mitigates dilution and mixing of formation fluids and the well-treatment fluid. In some instances, dilution of the well-treatment fluid may reduce the efficacy of the fluid. Further, in some instances, formation fluids or components thereof (e.g., salts) may deactivate components of the fluid, thereby rendering the wellbore operation ineffective. In extreme cases, wellbore pressures less than the pore pressure may cause dangerous blowout conditions with the potential for complete well failure.

In order to manage the ECD of a fluid, real-time measurements of the properties of the well-treatment fluid are made during downhole operations. One such property is the gel strength of the well-treatment fluid. The gel strength is the peak stress, which the fluid gel structure can sustain after a well treatment fluid has set quiescently for a period of time. As will be realized, the accuracy of the real-time measurements is important.

BRIEF DESCRIPTION OF THE DRAWINGS

The drawings included with this application illustrate certain aspects of the embodiments described herein. However, the drawings should not be viewed as exclusive embodiments. The subject matter disclosed herein is capable of considerable modifications, alterations, combinations, and equivalents in form and function, as will be evident to those skilled in the art with the benefit of this disclosure.

FIG. 5 shows the results of $(GS\text{-}30\ min)^p{}_{RTFP}$ as described in Example 2.

FIG. 6 shows the results of $(GS\text{-}10\ sec)^p{}_{RTFP}$ as described in Example 2.

DETAILED DESCRIPTION

Figure 1:
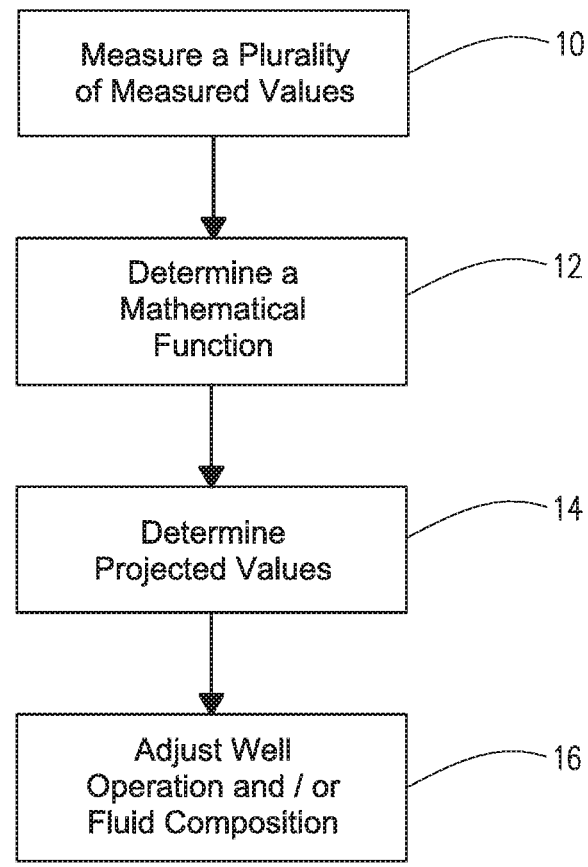
FIG. 1 is a flow chart illustrating the steps of a method in accordance with some embodiments.

The present disclosure may be understood more readily by reference to this detailed description, including the figures. For simplicity and clarity of illustration, where appropriate, reference numerals may be repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may have been exaggerated to better illustrate details and features of the present disclosure.

This disclosure provides for systems and methods of determining values representing the gel strengths of well-treatment fluids so as to allow for real-time adjustments of well operations based on the determined gel strength. Such adjustments can include adjusting one or more operational parameters for the use of the well-treatment fluid in the well operation, for example, pumping start-up rates or acceleration rates in tripping pipe. Further, such adjustment can include adjusting the composition of the well-treatment fluid so as to alter the gel strength or other properties.

API Guidelines 13B-1 and 13B-2 are used for testing properties water-based and oil-based drilling fluids, respectively. The properties include gel strength measurements. Conventional methods of evaluating drilling fluid properties according to the API standards is primarily based on manually performed tests, this applies to both on shore drilling fluid laboratories and at the actual drill site. Many of these standard tests are virtually unchanged since they originated in the middle of the last century. Unfortunately, such manual testing is insufficient to keep up with the real-time activities at a drill site. For example, the routine standard tests for gel strength according to API Guidelines 13B-1 and 13B-2 might be performed two times per each 12-hour shift during drilling operations. This means that critical downhole decisions may be based on data that potentially could be several hours old and may not truly reflect the actual condition of the drilling fluid.

The importance of the above delays can be realized from the characteristic that as gelled treatment fluids are static for longer times they build more of a gelled structure. Accordingly, the longer the gel is static the larger impact it will have on ECD (wellbore pressure). For example, a fluid that has been static for 30 minutes will have a higher pressure on pump start up than one that has been static for 10 minutes. This is true when all other conditions such as the pump rate ramp, etc. are identical. A similar case exists for tripping pipe. Surge and swab pressures will be larger for longer quiescent times, with all other conditions being equal such as acceleration rate of the drill string.

Automation of the routine tests has opened the possibility of more frequent testing. For example, Halliburton Energy Services has developed and tested various ways of automated testing and real time monitoring of drilling fluid properties. These automated units can give real-time fluid properties (RTFP); however, for gel strength, they are still limited by the static period. The static period is the resting or static duration after shearing and before a measurement is taken. In further detail, the well fluid is sheared during testing in a viscometer, typically at a shear rate above 170 $s^{-1}$ (this corresponds to an rpm above 100 rpm on a viscometer such as model R1B1 marketed by Fan Instrument Company, which is consistent with the requirements of API Guidelines 13B-1 and 13B-2), more typically greater than 340 $s^{-1}$ (above 200 rpm on the model R1B1) and often at about 511 $s^{-1}$ or about 1021 $s^{-1}$ (300 rpm or 600 rpm, respectively on the model R1B1). Shearing is typically carried out for up to a minute, generally for 5 to 20 sec and more typically for about 10 sec. After shearing, the well fluid is static—no rotation or shearing—for the "static period", also called "static duration" or "rest time". At the end of the static period, the gel strength measurement is made. For example, a 10-sec gel strength measurement (GS-10 sec) requires a 10-second static period after shearing before the taking of the gel strength reading. Similarly, a 10-min gel strength measurement (GS-10 min) requires a 10-minute static period, and a 30-min gel strength measurement (GS-30 min) requires a 30-minute static period. While for shorter static periods this delay can be tolerated in a real-time system, longer periods (greater than 20-minutes) start to introduce substantial delays in the real-time system such that actual conditions of the drilling fluid downhole are no longer reflected. Further, it has been discovered that some real-time readings do not correspond to the API standard readings as well as others; thus, introducing errors in the measured gel strength determined by the real-time system.

The current systems and methods provide for a way of overcoming these deficiencies in real-time readings of gel strengths for well-treatment fluids by measuring gel strength for only a few static periods—typically three to five static periods and preferably three static periods—and extrapolating the gel strength for other static periods based on a mathematical function determined by curve-fitting from the measured gel strengths. Generally, there will be three or more measured gel strengths, for example, three to ten measured gel strengths. However, the application of the system and method can adequately reflect the well fluid in real time with as low as 3-measured gel strengths. Thus, the number of measured gel strengths will typically be three to five, more typically three. Further, the system and method can be more beneficial for real-time applications where shorter static periods are used for the measured gel strengths; thus, typically the rest period for the measured gel strengths is 20 minutes or less and can be 10 minutes or less.

Further, most embodiments of the invention will use a GS-0 sec measurement, For example, the measured gel strengths can be at GS-0 sec, a 5-min gel strength (GS-5 min) and 10-min gel strength (GS-10 min). As used herein, "GS-0 sec" means the gel strength is measured to reflect approximately no gel structure, thus, the gel strength immediately after the shear stress in the viscometer is stopped. Accordingly, unlike prior measurement systems and methods, the current disclosure provides for a GS-0 sec measurement where the treatment fluid has essentially no gel structure. Thus, the GS-0 sec measurement represents the starting point for the increasing response due to gel structures forming.

Generally, this is accomplished by measuring the gel strength at a low rotation or shear rate, from above 0 $s^{-1}$ to 170 $s^{-1}$ (for example, from 0.1 to 100 rpm on an R1B1 type viscometer), typically from 1.5 $s^{-1}$ to 102 $s^{-1}$ (0.9 to 60 rpm on an R1B1 type viscometer), and more typically from 3.1 $s^{-1}$ to 10.2 $s^{-1}$ (from 1.8 to 6 rpm on an R1B1 type viscometer). For example, the GS-0 sec measurement can be made at 5.1 $s^{-1}$ (3 rpm on an R1B1 type viscometer). In other embodiments, the GS-0 sec measurement might use a higher shear (greater than 170 $s^{-1}$-100 rpm on an R1B1 type viscometer) and the gel strength measured with a static period of less than 2 sec, less than 1 sec, or immediately upon stopping the rotation or shearing. However, the difficulties in making such a quick measurement of gel strength means that the low-rotation method is more preferred.

Broadly, the systems and methods of determining gel strengths comprise the steps illustrated in FIG. 1. First, in step 10, a plurality of measured values representative of the gel strength of the well-treatment fluid are measured. Generally, the measured values will be the gel strength after a static period, but in some embodiments, the measured values might be viscosity or shear stress.

Generally, there will be a GS-0 sec measurement (little or no gel structure) and at least two measured values taken after a static period. That is, the well-treatment fluid under goes shearing in accordance with known methods above 170 $s^{-1}$ (100 rpm)—typically at about 511 $s^{-1}$ (300 rpm) or at about 1021 $s^{-1}$ (600 rpm)—in a viscometer, such as a model 35 Viscometer or R1BA model marketed by Fann Instrument Company. After a predetermined time—for example about 10 seconds—the rotation/shearing is stopped and the gel is static for a pre-selected static period. Generally, each measured value will be after a different pre-selected static period and there will be at least three such measurements. Thus, there can be a first measured value-typically a GS-0 sec value, a second measured value after a second static period and third measured value after a third static period.

Generally, the second measured value and third measured value are measured with the second static period and third static period being from 1 minute to 20 minutes. Additionally, the second static period is not the same length of time as the third static period. For example, the second static period can be from 2 minutes to 7 minutes, or from 3 minutes to 7 minutes, or can be about 5 minutes. The third static period can be from 8 minutes to 15 minutes, from 8 minutes to 12 minutes or about 10 minutes.

Figure 2:
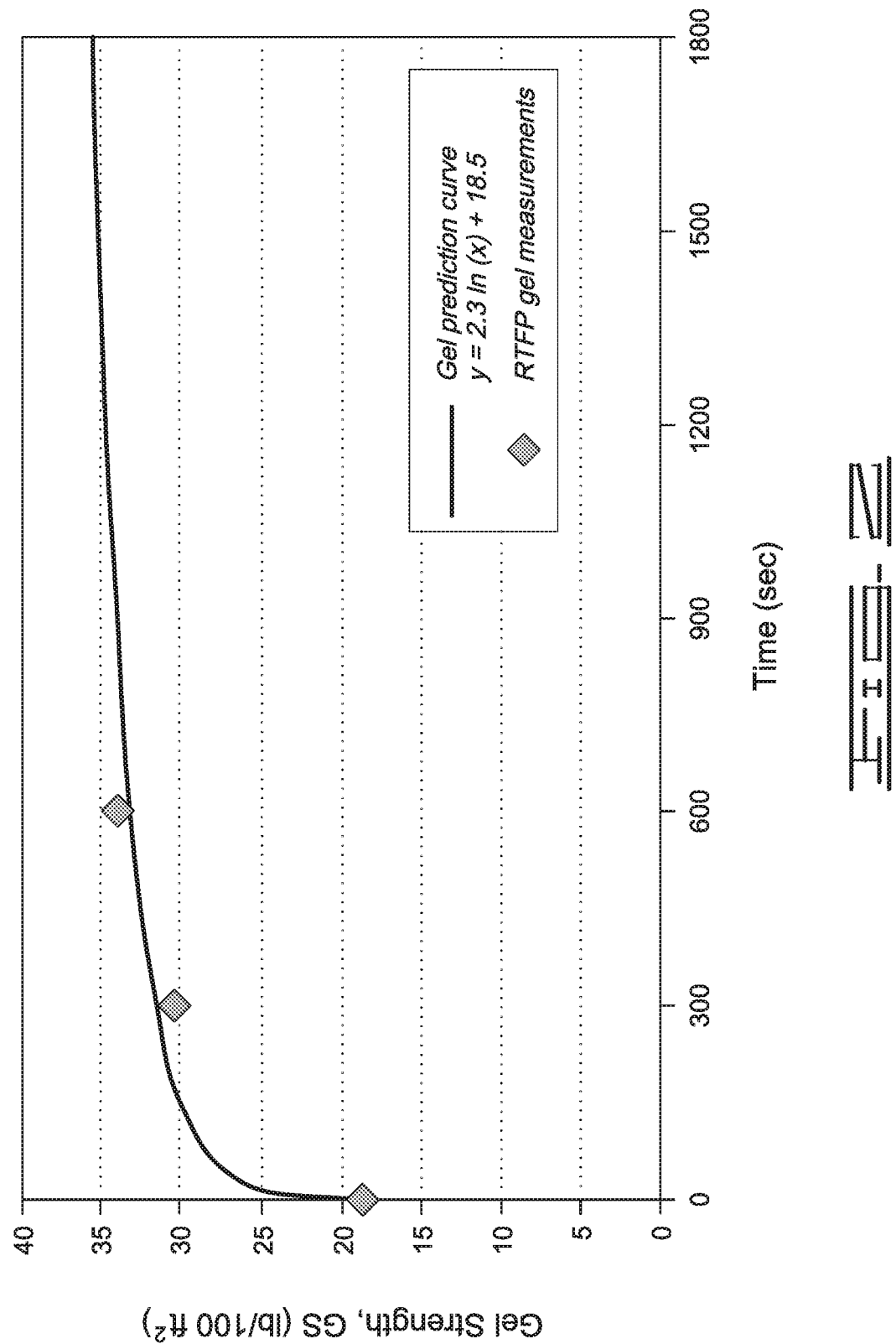
FIG. 2 is graph illustrating curve fitting in relation to three measured values of gel strength at different static periods (time).

After the plurality of measured values is obtained, a mathematical function that fits the plurality of measured values is determined in step 12. Generally, the function is obtained by curve fitting the gel strength as a function of the static period—time—so as to arrive at a predictive curve. An example is illustrated in FIG. 2. Thus for three measured values, the resulting function can be represented as:

$$GS(t)^p{}_{RTFP} = f[GS_1, GS_2, GS_3]_{RTFP}$$

Where, $GS(t)^p{}_{RTFP}$ is the gel strength for a static period t, $GS_1$ is the first measured value, which can be for a non-0 static time but typically will be a GS-0 sec measurement. $GS_2$ is the second measured value with t greater than 0 sec, $GS_3$ is the third measured value with t greater than 0 sec, and f represents to function fitting the real-time fluid properties—the plurality of measured values representing gel strength. The function f can be any suitable function, for example a power function, an exponential function, a polynomial function, a linear function, and combinations of the foregoing functions.

In step 14, the mathematical function used to determine one or more projected values representative of the gel strength for the well-treatment fluid after a projected-value static period. For example, the mathematical function can be used to determine gel strength for static periods of greater than 20 minutes, 30 minutes or greater, 1 hour or greater, or even for up to 4 or 6 hours. In some embodiments, the projected-values will be for a static period where it is difficult to obtain accurate real-time measurements. For example, the projected value can be determined with the projected-value static period being selected from a range of 5 to 15 seconds or from 20 minutes to 1 hour.

The projected values will be the same type of values as the measured values, i.e. typically will be the gel strength after, but in some embodiments, might be viscosity or shear stress.

In many embodiments, two or more projected values will be determined. For example, there can be a first projected value determined for a first projected-value static period selected from a range of 5 to 15 seconds, and there can be a second projected value determined for a second projected-value static period selected from a range of 20 minutes to 6 hours.

After the projected values are obtained, the use or composition of the well-treatment fluid can be adjusted in step 16. For example, an operational parameter of a well-treatment operation can be adjusted or well-treatment operation can be adjusted. Optionally, the composition of the well-treatment fluid can be adjusted so as to change its gel-strength properties.

The current systems and methods are applicable to a wide variety of downhole operations. For example, they are applicable to drilling processes. In one specific embodiment, the system and method can be used in the type of drilling operation further described below in relation to FIG. 3. In this embodiment, the gelled well-treatment fluid is a drilling fluid which is used in the drilling operation in the well. For example, the method and system can be used in restarting the flow of the drilling fluid after a period of static drilling fluid flow; that is, when the flow of the drilling fluid has been stopped for some period of time.

In this embodiment, the plurality of measured values and a mathematical function are obtained as described above. Then, from the mathematical function, a projected value representative of the gel strength for the drilling fluid is determined after static time equal to the period of static drilling fluid flow. Afterwards, an operational parameter for the restarting of the flow of drilling fluid is applied to the drilling operation based on the projected value. For example, such operating parameters can be well-treatment fluid circulation rate, drilling speed, etc.

Figure 3:
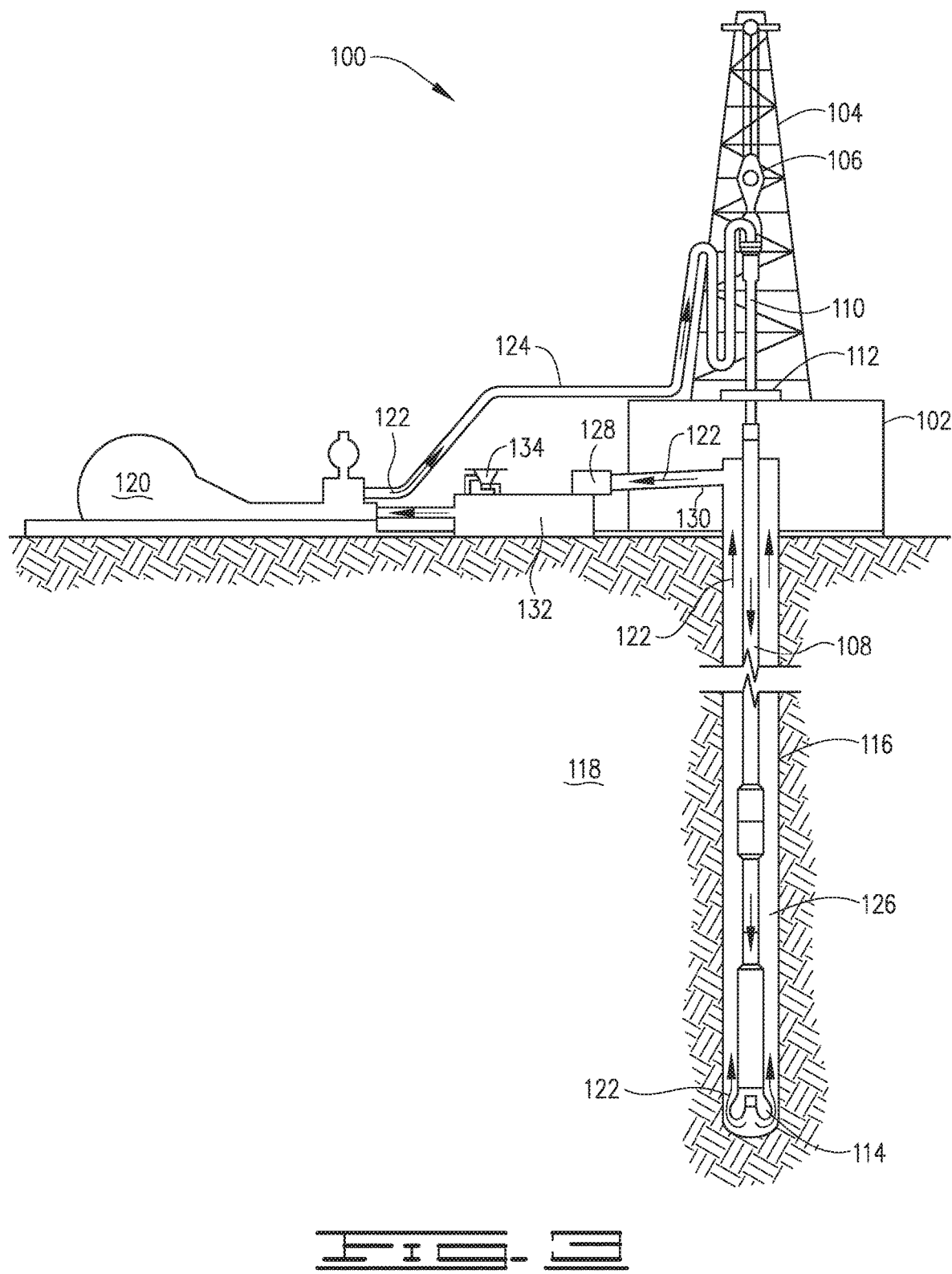
FIG. 3 is schematic representation of an exemplary wellbore drilling assembly.

By way of example and not limitation, the above processes are applicable to the drilling operation shown in FIG. 3; however, such processes application to other well-treatment operations will be readily understood from the application to a drilling operation. For example, and with reference to FIG. 3, the disclosed systems and processes may be used with one or more components or pieces of equipment associated with an exemplary wellbore drilling assembly 100, according to one or more embodiments. It should be noted that while FIG. 3 generally depicts a land-based drilling assembly, those skilled in the art will readily recognize that the principles described herein are equally applicable to subsea drilling operations, which employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A Kelly 110 supports the drill string 108 as it is lowered through a rotary table 112. A drill bit 114 is attached to the distal end of the drill string 108 and is driven either by a downhole motor and/or via rotation of the drill string 108 from the well surface. As the drill bit 114 rotates, it creates a borehole 116 that penetrates various subterranean formations 118.

A pump 120 (e.g., a mud pump) circulates drilling fluid 122 through a feed pipe 124 and to the Kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the borehole 116 via the annulus 126, those skilled in the art will readily appreciate that the fluid processing unit(s) 128 may be arranged at any other location in the drilling assembly 100 to facilitate its proper function, without departing from the scope of the disclosure.

One or more chemicals or additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. However, the chemicals or additives may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units.

While not specifically illustrated herein, the disclosed system and methods can also be used to measure properties of drilling fluids in transport or delivery equipment used to convey the drilling fluid to the drilling assembly 100 such as, for example, any transport vessels, conduits, pipelines, trucks, tubulars, and/or pipes used to fluidically move the drilling fluid from one location to another.

Figure 4:
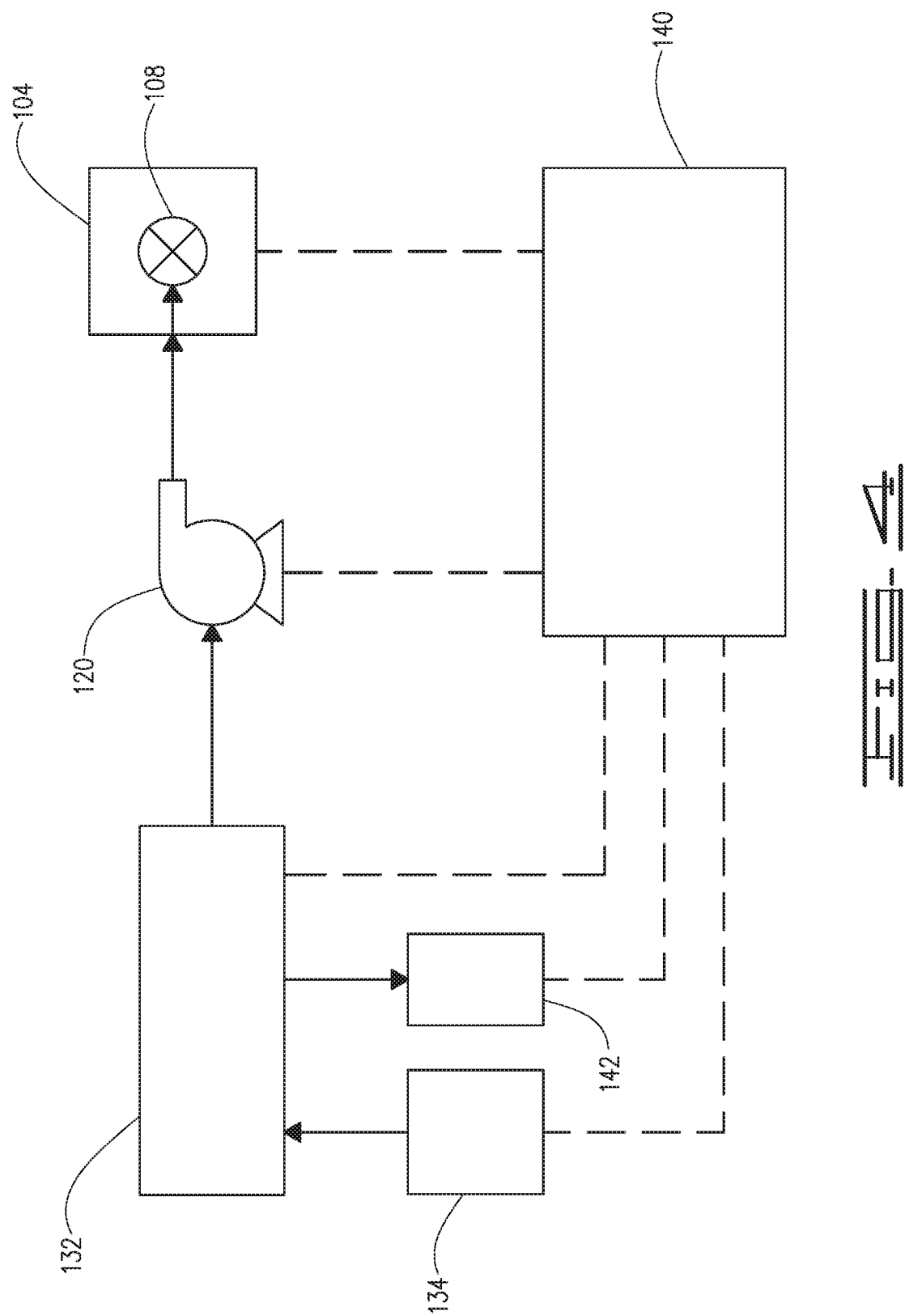
FIG. 4 is a schematic diagram of a simplified system for determining values representative of the gel strength of a drilling fluid and for making adjustments to the drilling fluid system.
Figure 7:
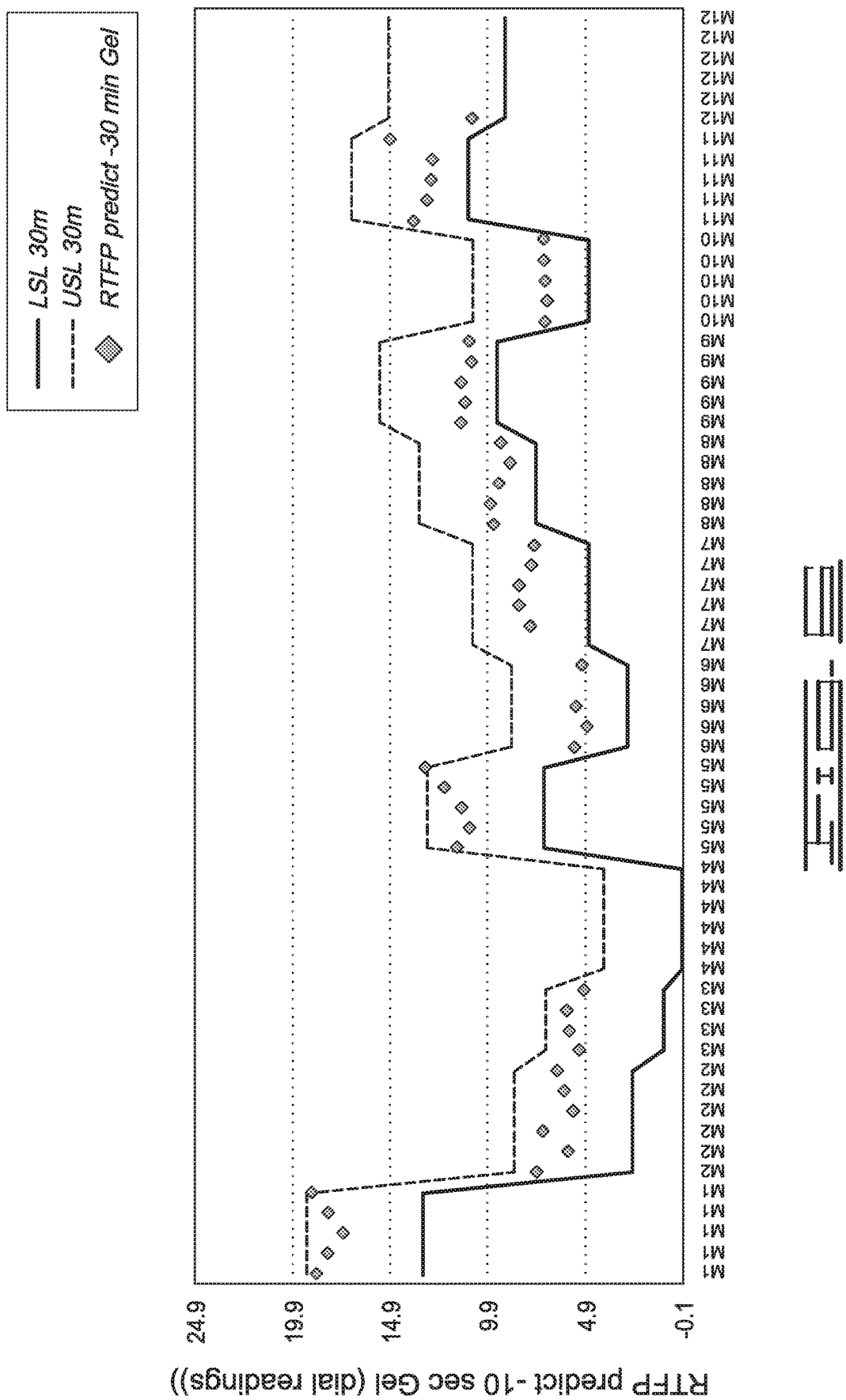

Turning now to FIG. 4, a schematic diagram of a simplified system for determining values representative of the gel strength of a drilling fluid and for making adjustments to the drilling fluid system is illustrated. Specifically, the illustrated system allows for the adjustment of the composition of the drilling fluid or adjustment of one or more components or pieces of equipment associated with the preparation, delivery, use, recapture, recycling, reuse, and/or disposal of drilling fluid. The system includes a processing system 140, which can include a computer-processing unit, memory (random access memory, hard drive disk, optical disk drives, flash drives, etc.) and other computer system components. Processing system 140 is in communication with viscometer system 142, which receives samples of drilling fluid from retention pit 132. The samples received by viscometer 142 are tested to measure three or more measured values related to the gel strength of the drilling fluid. The data related to the measured values is sent to processing system 140, where curve fitting and determination of projected values is performed in accordance with the processes discussed above.

Processing system 140 also can be in communication with mixing hopper 134, pump 120 and derrick 104. Based on the projected values and/or measured values, processing system 140 can change the amount or type of additives introduced through mixing hopper 134, change the pumping rate, or change other operating parameters such as the drilling speed.

While described as a drilling fluid for the above-described drilling assembly, the systems and methods of this disclosure are more broadly applicable where real-time estimates of gel strengths are needed for any well-treatment fluids. The well-treatment fluids are aqueous-based or oil-based well-treatment fluid utilizing a gelling agent or viscosifier, as are known in the art.

If the treatment fluid is used for drilling then the oil-based drilling fluids or water-based drilling fluids can comprise clays such as bentonite clay. Additionally, the treatment fluid can comprise additives to enhance properties or provide additional properties to the wellbore fluid. Typical types of additives are rheology modifiers, shale stabilizers or flocculants, fluid loss additives, emulsion stabilizers, corrosion inhibitors, lubricants and weighting agents.

For example, a well-treatment fluid can include an aqueous based fluid and an additive that increases the viscosity of the treatment fluid over the based fluid alone ("viscosifier"). Suitable aqueous based fluids that may be used in the treatment fluids of the present invention may include fresh water, salt water, brine, formation brine, seawater, or any other aqueous fluid that, preferably, does not adversely interact with the other components used in accordance with this invention or with the subterranean formation.

Suitable viscosifiers or gelling agents for aqueous based fluids include water-soluble polymers. Such water-soluble polymer include guar gums, guar derivatives, cellulose-based derivatives, high-molecular weight polysaccharides composed of mannose and galactose sugars, xanthan and other natural polymers and their derivatives. Additionally, synthetic polymers, such as polyacrylamides and polyacrylates, can be used as the viscosifier. Guar derivatives, for example, include hydropropyl guar (HPG), carboxymethyl guar (CMG), carboxymethylhydropropyl guar (CMHPG) and hydroxyethylated guar (HEG). Cellulose derivatives, for example, include hydroxyethylcellulose (HEC), hydroxypropylcellulose (HPC), carboxymethyl cellulose (CMC) and carboxymethylhydroxyethylcellulose (CMHEC).

The polymers used as viscosifiers can be linear polymer but, where higher viscosities are desired, the linear polymers can be crosslinked. Various crosslinking agents can be used in association with the above viscosifiers to achieve such higher viscosities, typically where reservoir conditions indicate that greater viscosities differences between the low-viscosity fluid and the high-viscosity fluid would be useful, as further described below. Crosslinking agents are known in the art and may, for example, be based on boron, titanium, zirconium or aluminum complexes and can be used to increase the effective molecular weight of the polymer to achieve such higher viscosities in the viscosified treatment fluid.

In certain embodiments, the well-treatment fluids of the present invention also may optionally comprise salts, pH control additives, surfactants, breakers, bactericides, crosslinkers, fluid loss control additives, stabilizers, chelants, scale inhibitors, paraffin inhibitors, asphaltene inhibitors, mutual solvents, solvents, corrosion inhibitors, hydrate inhibitors, clay stabilizers, salt substitutes (such as tetramethyl ammonium chloride), relative permeability modifiers (such as HPT-1™ chemical additive available from Halliburton Energy Services, Duncan, Okla.), sulfide scavengers, fibers, nanoparticles, consolidating agents (such as resins and/or tackifiers), combinations thereof, or the like.

In many embodiments, the well-treatment fluids will contain surfactants that aid in or promote the formation of hydrates under the conditions in the wellbore near the surface, i.e. the location in the wellbore where the vaporized natural gas and treatment fluid are introduced. For example, the treatment fluids can contain one or more of the surfactants selected from the group consisting of sodium dodecyl sulfate (SDS), cetyltrimethylammonium bromide (CTAB), dodecyl alcohol ethoxylates (AEO), alpha olefin sulfanate (AOS), methyl ester sulfanate (MES) and mixtures thereof.

The above method, its steps and systems incorporating the method can be better understood by the following examples, which support and illustrate the process.

EXAMPLES

Example 1

Eleven drilling fluids (muds) were evaluated for gel strength using API Standard and a real-time fluid property (RTFP) gel-measurement device. Of the eleven muds, 9 were oil-based muds (OBM) and 2 were water-based muds (WBM) with significant variation in composition and properties. The composition and property of the muds are shown in Table 1.

TABLE 1

| Fluid System | Fluid Base | MW (ppg) | % OWR (oil/water ratio) | Salinity | ASG (Average Specific Gravity) |
|---|---|---|---|---|---|
| OBM-1 | Ester/Internal Olefin Blend | 15.66 | 66.7 | 273,357 | 3.89 |
| OBM-2 | Ester/Internal Olefin Blend | 19.00 | 86.25 | 303,990 | 3.97 |
| OBM-3 | Ester/Internal Olefin Blend | 10.88 | 66.26 | 110,756 | 3.29 |
| OBM-4 | Isomerized Olefin | 11.28 | 80.27 | 150,731 | 3.61 |
| OBM-5 | Isomerized Olefin | 16.26 | 66.32 | 117,516 | 4.18 |
| OBM-6 | Isomerized Olefin | 19.53 | 85.61 | 124,270 | 4.15 |
| OBM-7 | Diesel | 12.54 | 81.44 | 200,558 | 3.69 |
| OBM-8 | Diesel | 15.23 | 66.39 | 89,882 | 4.16 |
| OBM-9 | Diesel | 20.76 | 85.48 | 195,772 | 4.10 |
| WBM-10 | KCL/Water | 10.03 | 0 | 31,231 | 3.46 |
| WBM-11 | KCL/Water | 14.89 | 0 | 72,392 | 3.84 |

The above drilling muds were tested for gel strength using API Guidelines 13B-1 and 13B-2. The gel strengths of these fluids were measured for static durations of 10 sec, 10 min and 30 min using a RheoVADR Rheometer with a R1B1 viscometer marketed by Fann Instrument Company.

The above drilling muds were also tested using an RTFP gel-measurement device. The rotational rheology of the fluid and the gel strength of these fluids were measured for static durations of 10 sec, 5 min, 10 min and 30 min based on the standard API guidelines, but adapted for RTFP measurements.

Statistical analysis confirmed that the measured values of 10-sec gel strength and 30-min gel strength from the RTFP gel-measurement device did not match with the corresponding API measurements, as shown in Table 2.

TABLE 2

| Gels | | Error Value | 95% CL (Upper) | p-value | Conclusion |
|---|---|---|---|---|---|
| 10 sec | Mean | 1.1 | 1.4 | 0.0 | Pass: accuracy requirements with +/−3 DR |
| | StD | 1.2 | 1.9 | 0.7 | Not Pass: Observed out of spec = 9% and expected = 13% |
| 10 min | Mean | 1.4 | 1.6 | 0.0 | Pass: accuracy requirements with +/−3 DR |
| | StD | 0.8 | 1.1 | 0.1 | Pass @ 90% CL |
| 30 min | Mean | 1.5 | 1.9 | 0.0 | Pass: accuracy requirements with +/−4 DR |
| | StD | 1.66 | 2.5 | 0.826 | Not Pass: Observed out of spec = 7.2% and expected = 7.9% |

* "DR" refers to "dial reading" which was about 1 lb/100 ft$^2$)

Accordingly, Example 1 illustrates that the RTFP measurements can be inaccurate for at least the short (10-sec gel strength) or long (30-min gel strength) measurements.

Example 2

The method of the invention was applied to the 11 drilling fluids of Example 1. The method was based on a first measured value being a GS-0 sec measurement taken while the drilling fluid is under 3 RPM shear rotation; hence no gel structure. The second measured value was for a 5-min static period (GS-5 min) and the third measurement was for a 10-min static period (GS-10 min). These measured values were used to determine a function in accordance with the equation:

$$GS(t)^P{}_{RTFP} = f[\text{GS-0 sec, GS-5 min, GS-10 min}]_{RTFP}$$

Based on this model, gel strength values for measurements at 10 sec static period (GS-10 sec) and 30 min static period (GS-30 min) were predicted. Additionally for the model-determined value of (GS-10 sec)$^P{}_{RTFP}$, a statistical correction factor was applied. The method was performed 5 times for each of the 11 drilling fluids. The measured values were then compared with the upper and lower specs limit (USL and LSL) based on measurements performed under the API Guidelines.

FIG. 5 shows the results for (GS-30 min)$^P{}_{RTFP}$ obtained from the gel model (based on Eq. 1) for the studied drilling fluids. The lines represent the USL and LSL based on (GS-30 min)$_{API}$±4 dial readings for each of the fluids. As can be seen, the predicted values for GS-30 min all lie between or on the USL and LSL lines; thus, there is fair agreement between the API estimates and RTFP predicted values.

FIG. 6 shows the results for (GS-10 sec)$^P{}_{RTFP}$ obtained from the gel model (based on Eq. 1) for the studied drilling fluids. The lines represent the USL and LSL based on (GS-10 sec)$_{API}$±3 dial readings for each of the fluids. As can be seen, the predicted values for GS-10 sec all lie between or on the USL and LSL lines; thus, there is fair agreement between the API estimates and RTFP predicted values.

The above disclosure is exemplified by a method of adjusting a well operation, wherein the well operations uses a well-treatment fluid having gel strength. The method comprises the steps of:

measuring a plurality of measured values representative of the gel strength of the well-treatment fluid, wherein each of the measured values represent gel strength for a different static period than the other measured values;

determining a mathematical function that fits the plurality of measured values;

determining from the mathematical function a projected value representative of the gel strength for the well-treatment fluid after a projected-value static period, wherein the projected-value static period is different from the static period of each of the measured values; and adjusting at least one of (a) an operational parameter of the use of the well-treatment fluid in the well operation or (b) the composition of the well-treatment fluid based on the projected value.

Generally, there is a first measured value that is GS-0 sec measured value and a second measured value for a second static period and third measured value for a third static period. The second measured value and third measured value are typically measured with the second static period and third static period being from 1 minute to 20 minutes and the second static period not being the same as the third static period. For example, the second static period can be from 1 minute to less than 10 minutes, and the third static period is from 10 minutes to 20 minutes. Alternatively, the second static period can be from 2 minutes to less than 8 minutes, and the third static period is from 8 minutes to 15 minutes, or the second static period can be from 3 minute to 7 minutes, and the third static period can be from 8 minutes to 12 minutes. Generally, the second static period is about 5 minutes and the third static period is about 10 minutes.

Generally, the projected value is determined for fairly short periods or fairly long periods. For example, the projected value can be determined with the projected-value static period being selected from a range of 5 seconds to 1 minute or from 20 minutes to 1 hour, or longer. More typically, the projected-value static period can be selected from a range of 5 to 15 seconds or from 20 minutes to 1 hour.

In some embodiments, a viscometer is used in measuring the plurality of measured values. Also, the plurality of measured values and the projected values can be selected from gel strength, viscosity and shear stress.

In some embodiments, the method will determine two or more projected values with each projected value being determined after a different projected-value static period. For example, a first projected value can be determined for a first projected-value static period selected from a range of 5 seconds to 1 minute, and a second projected value can be determined for a second projected-value static period selected from a range of 20 minutes to 1 hour, or longer. More typically, the first projected-value static period can be selected from a range of 5 to 15 seconds, and the second projected-value static period can be selected from a range of 20 minutes to 1 hour.

In some of the above embodiments, the method concerns a drilling operation. In such embodiments, the gelled well-treatment fluid is a drilling fluid which is used in the drill operation in the well. Also, the step of adjusting involves determining the operational parameters to use when restarting fluid flow after flow of drilling fluid into the well has been stopped, and the projected-value static period is the period of time during which the flow of drilling fluid has been stopped.

More specifically, when the method concerns drilling operations, the method can be for restarting flow of a drilling fluid in drilling operations after a period of static drilling fluid flow. The method can comprise the steps of:

measuring a plurality of measured values representative of the gel strength of the drilling fluid, wherein each of the measured values represents gel strength for a different static period than the other measured values;

determining a mathematical function that fits the plurality of measured values:

determining from the mathematical function a projected value representative of the gel strength for the drilling fluid at a projected-value static period wherein the projected-value time is equivalent to the period of static drilling fluid flow; and applying at least one operational parameter for the restarting of the flow of drilling fluid based on the projected value.

In some embodiments, this method can further comprise determining a second projected value representative of the gel strength after a second projected value static period, and adjusting the composition of the well-treatment fluid based on the second projected value. Alternatively, these steps of determining a second projected value and adjusting the composition can take the place of the steps of determining the projected value and applying at least one operation parameter in the above method.

Therefore, the present compositions and methods are well adapted to attain the ends and advantages mentioned, as well as those that are inherent therein. The particular examples disclosed above are illustrative only, as the present treatment additives and methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present treatment additives and methods. While compositions and methods are described in terms of "comprising," "containing," "having," or "including" various components or steps, the compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of adjusting a well operation, wherein the well operation uses a well-treatment fluid having a gel strength, the method comprising:

measuring a plurality of measured values representative of the gel strength of the well-treatment fluid, wherein each of the measured values represent gel strength for a different static period than the other measured values such that there is a first measured value that is a GS-0 sec measured value, and there is a second measured value for a second static period and third measured value for a third static period, and wherein the GS-0 sec measured value is measured either (a) within a 2 sec static period after shearing or (b) measured at a shear rate from above 0 s$^{-1}$ to 170 s$^{-1}$, such that the well treatment fluid has no gel structure;

determining a mathematical function that fits the plurality of measured values;

determining from the mathematical function a projected value representative of the gel strength for the well-treatment fluid after a projected-value static period, wherein the projected-value static period is different from the static period of each of the measured values; and adjusting at least one of (a) an operational parameter of the use of the well-treatment fluid in the well operation or (b) the composition of the well-treatment fluid based on the projected value.

2. The method of claim 1, wherein the GS-0 sec measured value is measured within a 2 sec static period after shearing, and the second static period and the third static period are from 1 minute to 20 minutes, and the second static period is not the same as the third static period.

3. The method of claim 1, wherein the GS-0 sec measured value is measured at a shear rate from above 0 s$^{-1}$ to 170 s$^{-1}$, and the second static period and the third static period are from 1 minute to 20 minutes, and the second static period is not the same as the third static period.

4. The method of claim 3, wherein the second static period is from 3 minutes to 7 minutes, and the third static period is from 8 minutes to 12 minutes.

5. The method of claim 3, wherein the projected value is determined with the projected-value static period being selected from a range of 5 to 15 seconds or from 20 minutes to 1 hour.

6. The method of claim 5, wherein the well-treatment fluid is a drilling fluid which is used in a drilling operation in the well, and wherein the step of adjusting involves determining the operational parameters to use when restarting fluid flow after flow of drilling fluid into the well has been stopped, and the projected-value static period is the period of time during which the flow of drilling fluid has been stopped.

7. The method of claim 6, wherein a viscometer is used in measuring the plurality of measured values.

8. The method of claim 7, wherein the plurality of measured values and the projected values are selected from gel strength, viscosity and shear stress.

9. The method of claim 1, wherein the projected value comprises two or more projected values with each projected value being determined after a different projected-value static period.

10. The method of claim 9, wherein there is a first projected value determined for a first projected-value static period selected from a range of 5 to 15 seconds, and there is a second projected value determined for a second projected-value static period selected from a range of 20 minutes to 1 hour.

11. The method of claim 1, wherein a viscometer is used in measuring the plurality of measured values.

12. The method of claim 1, wherein the plurality of measured values and the projected values are selected from gel strength, viscosity and shear stress.

13. A method of restarting flow of a drilling fluid in a drilling operation after a period of static drilling fluid flow, wherein the drilling fluid has a gel strength, the method comprising:

measuring a plurality of measured values representative of the gel strength of the drilling fluid, wherein each of the measured values represents gel strength for a different static period than the other measured values such that there is a first measured value that is a GS-0 sec measured value, and there is a second measured value for a second static period and third measured value for a third static period, and wherein the GS-0 sec measured value is measured either (a) within a 2 sec static period after shearing or (b) measured at a shear rate from above $0\ s^{-1}$ to $170\ s^{-1}$, such that the well treatment fluid has no gel structure;

determining a mathematical function that fits the plurality of measured values;

determining from the mathematical function a projected value representative of the gel strength for the drilling fluid at a projected-value static period wherein the projected-value time is equivalent to the period of static drilling fluid flow; and applying at least one operational parameter for the restarting of the flow of drilling fluid based on the projected value.

14. The method of claim 13, wherein the GS-0 sec measured value is measured either (a) within a 2 sec static period after shearing, and the second static period and the third static period are from 1 minute to 20 minutes, and the second static period is not the same as the third static period.

15. The method of claim 14, wherein the second static period is from 3 minutes to 7 minutes, and the third static period is from 8 minutes to 12 minutes.

16. The method of claim 14, wherein the projected value is determined with the projected-value static period being selected from a range of 5 to 15 seconds or from 20 minutes to 1 hour.

17. The method of claim 13, wherein GS-0 sec measured value is measured at a shear rate from above $0\ s^{-1}$ to $170\ s^{-1}$, and the second static period and the third static period are from 1 minute to 20 minutes, and the second static period is not the same as the third static period.

18. The method of claim 13, wherein a viscometer is used in measuring the plurality of measured values.

19. The method of claim 13, wherein the plurality of measured values and the projected values are selected from gel strength, viscosity and shear stress.

20. The method of claim 13, further comprising determining a second projected value representative of the gel strength after a second projected value static period, and adjusting the composition of the well-treatment fluid based on the second projected value.

* * * * *